(12) United States Patent
Kim et al.

(10) Patent No.: US 8,104,596 B2
(45) Date of Patent: Jan. 31, 2012

(54) CLUTCH ACTUATOR ASSEMBLY

(75) Inventors: Il Soo Kim, Seoul (KR); Sang Chul Park, Suwon (KR); Jeong Heon Kam, Yongin (KR); Han Ho Kwang, Yongin (KR); Woo Jim Cha, Yongin (KR); Kwang Soo Nam, Yongin (KR); Young Kwang Kim, Yongin (KR)

(73) Assignees: Hyundai Motor Company, Seoul (KR); Kia Motors Corporation, Seoul (KR); Hyundai Mobis, Yongin (KR)

( * ) Notice: Subject to any disclaimer, the term of this patent is extended or adjusted under 35 U.S.C. 154(b) by 632 days.

(21) Appl. No.: 12/274,148

(22) Filed: Nov. 19, 2008

(65) Prior Publication Data
US 2009/0229392 A1    Sep. 17, 2009

(30) Foreign Application Priority Data

Mar. 17, 2008  (KR) .................. 10-2008-0024428

(51) Int. Cl.
*F16D 23/12* (2006.01)

(52) U.S. Cl. ............... 192/20; 192/84.6; 192/93 R
(58) Field of Classification Search .............. 192/20, 192/84.6
See application file for complete search history.

(56) References Cited

U.S. PATENT DOCUMENTS

| | | | | |
|---|---|---|---|---|
| 5,010,993 A | * | 4/1991 | Carneiro et al. | 192/84.6 |
| 7,357,748 B2 | * | 4/2008 | Kelley, Jr. | 475/231 |

* cited by examiner

*Primary Examiner* — Richard M. Lorence
(74) *Attorney, Agent, or Firm* — Morgan, Lewis & Bockius LLP

(57) ABSTRACT

A clutch actuator assembly may include a motor provided with a rotatable worm shaft, a screw thread being formed at an exterior circumference of the worm shaft; a worm wheel having a disk shape, and provided with a worm gear engaged to the screw thread and first and second guiding holes; an operation unit mounted in the first and second guiding holes in order to move toward a radial direction of the worm wheel; and an upper body provided with a fork, and engaging or releasing a clutch by upward and downward movements of the fork corresponding to a movement of the operation unit.

14 Claims, 4 Drawing Sheets at initial state at operating state

CLUTCH ACTUATOR ASSEMBLY

CROSS-REFERENCE TO RELATED APPLICATION

The present application claims priority to Korean Patent Application No. 10-2008-0024428 filed Mar. 17, 2008, the entire contents of which application is incorporated herein for all purposes by this reference.

BACKGROUND OF THE INVENTION

1. Field of the Invention

The present invention relates to a clutch actuator assembly. More particularly, the present invention relates to a clutch actuator assembly that changes operation force applied to a clutch fork in a case in which a worm wheel is rotated by a motor.

2. Description of Related Art

Generally, a clutch actuator assembly is operated by hydraulic pressure and controls engaging or releasing of a clutch.

A conventional clutch actuator assembly includes a clutch disk, a clutch cover, a clutch fork, an operation cylinder, a master cylinder, and a clutch pedal.

The clutch disk and the clutch cover are engaged by a friction force such that torque applied to the clutch cover is transmitted to the clutch disk. That is, in a case in which the clutch disk and the clutch cover are closely contacted, the torque of the clutch cover is transmitted to the clutch disk by the frictional force. On the contrary, in a case that the clutch disk is separated from the clutch cover, the clutch disk and the clutch cover rotate independently.

The clutch fork closely contacts the clutch cover to the clutch disk or separates the clutch cover from the clutch disk so as to engage or release the clutch. Such the clutch fork is operated by the operation cylinder.

The master cylinder generates hydraulic pressure supplied to the operation cylinder and is mounted between the clutch pedal and the operation cylinder. Therefore, when a driver pushes the clutch pedal, the master cylinder generates the hydraulic pressure and supplies the hydraulic pressure to the operation cylinder.

The conventional clutch actuator assembly is used mainly for a manual transmission. However, use of the manual transmission is decreasing because of control difficulties thereof. On the contrary, use of a double clutch transmission (DCT) or an automated manual transmission (AMT) is increasing.

According to a double clutch transmission or an automated manual transmission, operation of a clutch is controlled by an electrical signal of a control unit. Therefore, it is difficult to apply the conventional clutch actuator assembly operated by the hydraulic pressure thereto.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a clutch actuator assembly having advantages that engaging or releasing of a clutch can be controlled by using a motor with a low capacity.

One aspect of the present invention is directed to provide a clutch actuator assembly that may include a motor provided with a worm shaft, wherein a screw thread is formed at an exterior circumference thereof, a worm wheel having first and second guiding holes and provided with a worm gear at outer circumference thereof to be engaged to the screw thread of the worm shaft, an operation unit mounted in the first and second guiding holes and moving in a radial direction from or to a rotation center of the worm wheel by operation of the worm wheel, and/or an upper body including a penetration hole, and engaging or releasing a clutch by pivotal movement of an end portion thereof according to a movement of the operation unit.

A fork may be formed at the end portion of the upper body to operably apply a force to a clutch cover of the clutch.

A supporter may be provided to rotatably support the worm wheel, wherein the worm wheel is displaced between the upper body and the supporter and the supporter provides a biasing force to a portion of the upper body with the operation unit.

The operation unit may include a ball hinge mounted in the first guiding hole, and/or an elastic member mounted in the second guiding hole. The ball hinge may further comprise an upper ball and a lower ball, diameter of the upper ball slidably disposed between the upper body and the worm wheel and larger than width of the first guiding hole, and diameter of the lower ball slidably disposed between the worm wheel and the supporter and larger than width of the first guiding hole.

A cam recess may be formed at the upper body and moves pivotally the upper body upwardly or downwardly when the ball hinge moves in the radial direction in the cam recess and contact the cam recess. An interior surface of the cam recess may be slanted downwards with respect to the rotation center of the worm wheel, and an upper surface of the supporter confronting the cam recess is flat. Longitudinal axes of the penetration hole, and the cam recess may be in parallel each other.

A cam hole may be formed at a lower surface of the supporter and configured to move pivotally the upper body upwardly or downwardly when the elastic member moves along the radial direction of the worm wheel in the cam hole. The lower surface of the supporter may be slanted downwards with respect to the rotation center of the worm wheel, and a lower surface of the upper body confronting the cam hole is flat.

Longitudinal axis of the cam hole may be in parallel to longitudinal axis of the penetration hole.

The elastic member may be mounted at a lower end of a sliding rod, an upper end of the sliding rod penetrates the upper body through the penetration hole and is connected to a head for limiting the upward movement of the upper body, wherein the head is larger than width of the penetration hole.

Diameter of the elastic member may be larger than width of the penetration hole.

A sliding ball sliding on the lower surface of the supporter may be mounted at a lower end of the elastic member.

The first and second guiding holes may be formed obliquely to the radial direction of the worm wheel and are formed in parallel with each other. The first and second guiding holes may be spaced from the rotation center of the worm wheel with the same distance.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
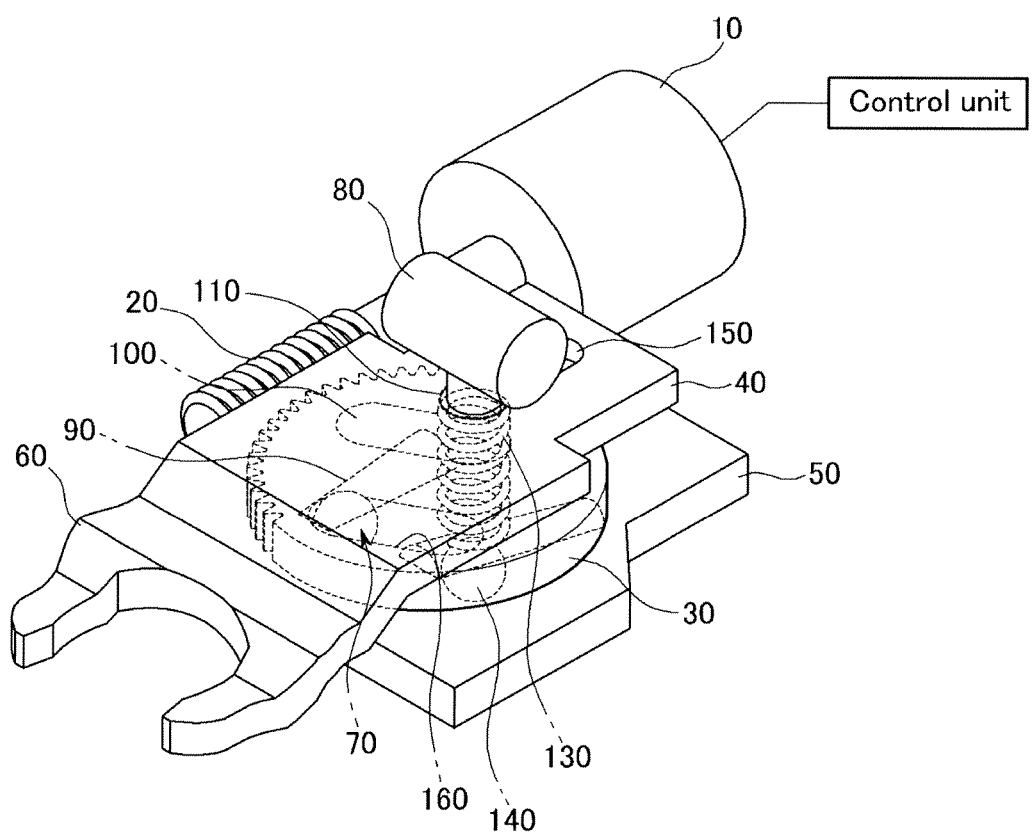
FIG. 1 is an opened-up view of an exemplary clutch actuator assembly according to the present invention.
Figure 2:
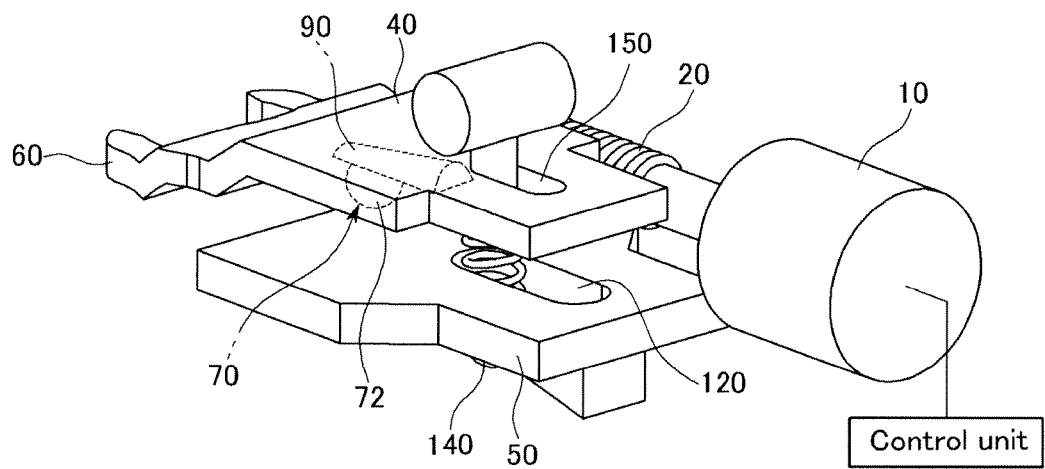
FIG. 2 is a perspective view of an exemplary clutch actuator assembly where a worm wheel is removed according to the present invention.
Figure 3:
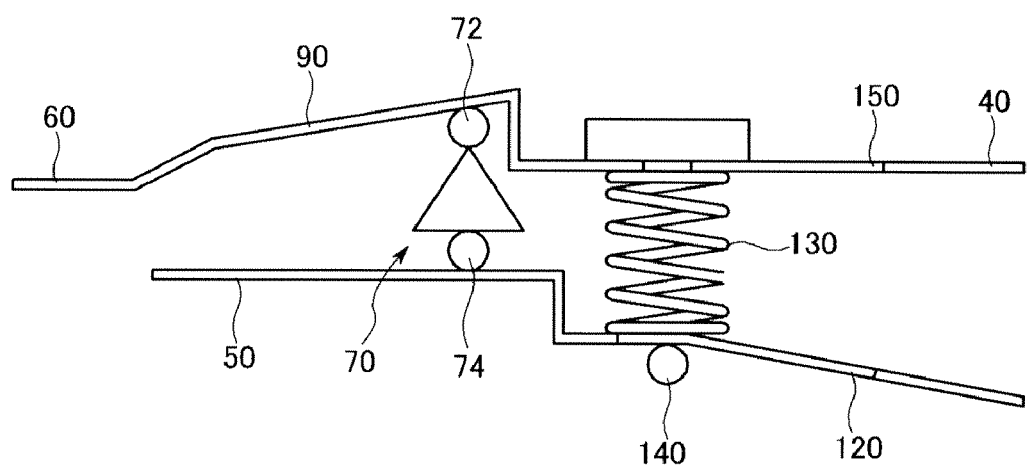
FIG. 3 is a cross-sectional view of an exemplary clutch actuator assembly where a worm wheel is removed according to the present invention.

FIG. 1 is an opened-up view of a clutch actuator assembly according to various embodiments of the present invention, FIG. 2 is a perspective view of a clutch actuator assembly where a worm wheel is removed according to various embodiments of the present invention, and FIG. 3 is a cross-sectional view of a clutch actuator assembly where a worm wheel is removed according to various embodiments of the present invention.

As shown in FIG. 1 to FIG. 3, a clutch actuator assembly according to various embodiments of the present invention includes a motor 10, a worm wheel 30, an upper body 40, a supporter 50, and an operation unit.

The motor 10 receives an electric signal from a control unit and rotates a worm shaft 20. A screw thread is formed at an exterior circumference of the worm shaft 20. In addition, the control unit generates the electric signal for controlling an operation of a clutch based on a driving condition of a vehicle such as a vehicle speed and an engine speed, and transmits the electric signal to the motor 10 as a control signal of the motor 10. The motor 10 may be a DC motor or a step motor.

The worm wheel 30 has a disk shape, and a worm gear is formed at an exterior circumference of the worm wheel 30 and engages with the screw thread of the worm shaft 20. When the motor 10 rotates, the worm wheel 30 rotates about a shaft that is perpendicular to the worm shaft 20. In addition, first and second guiding holes 160 and 100 are formed at the worm wheel 30, and more particularly, are formed obliquely to a radial direction of the worm wheel 30.

The upper body 40 is mounted on the worm wheel 30. A fork 60 coupled with a clutch cover is formed at one side of the upper body 40. The fork 60 closely contacts the clutch cover to a clutch disk or separates the clutch cover from the clutch disk.

In addition, a cam recess 90 is formed on a lower surface of the upper body 40 corresponding to the first guiding hole 160, and a penetration hole 150 is formed at the upper body 40. The penetration hole 150 corresponds to the second guiding hole 100. The cam recess 90 and the penetration hole 150 are formed along the radial direction of the worm wheel 30. In addition, an interior surface of the cam recess 90 is slanted, and the lower surface of the upper body 40 near the penetration hole 150 is flat.

The supporter 50 is formed under the worm wheel 30 and rotatably supports the worm wheel 30. A cam hole 120 is formed at a location corresponding to the second guiding hole 100 of the worm wheel 30 in the supporter 50. A lower surface of the cam hole 120 is slanted downwards, and an upper surface of the supporter 50 corresponding to the cam recess 90 is flat. In addition, the cam hole 120 is formed along the radial direction of the worm wheel 30.

The operation unit includes a ball hinge 70 mounted in and guided by the cam recess 90 and the first guiding hole 160, and an elastic member 130 mounted in and guided by the cam hole 120, the second guiding hole 100, and the penetration hole 150.

Balls are mounted respectively at upper and lower ends of the ball hinge 70. The ball hinge 70 is disposed in the first guiding hole 160. The upper ball 72 attached to an upper end of the ball hinge 70 is inserted in and guided along the cam recess 90 rotated by the worm wheel 30, and the lower ball 74 slides on the flat surface of the supporter 50 as the worm wheel 30 rotates.

In other words, a middle portion of the ball hinge 70 connects the upper and lower balls 72 and 74, and penetrates the first guiding hole 160. Since the first guiding hole 160 is formed obliquely to the radial direction of the worm wheel 30, the middle portion of the ball hinge 70 moves along the first guiding hole 160 and a moving direction of the ball hinge 70 is the radial direction of the worm wheel 30 when the worm wheel 30 rotates. For instance, in FIG. 1, when the worm wheel 30 rotates counterclockwise, the slanted first guiding hole 160 pushes the ball hinge 70 toward the center of the worm wheel 30 so that the distance between the ball hinge 70 and the center of the worm wheel 30 becomes shorter. In contrast, when the worm wheel 30 rotates clockwise, the slanted first guiding hole 160 pushes the ball hinge 70 outwards from the center of the worm wheel 30 so that the distance between the ball hinge 70 and the center of the worm wheel 30 becomes longer.

Since the interior surface of the cam recess 90 is slanted downwards, the ball hinge 70 moves upwardly or downwardly as well as to the radial direction of the worm wheel 30. Therefore, the upper body 40 moves upwardly or downwardly by upward or downward movement of the ball hinge 70 and thus engages or releases a clutch.

A sliding rod 110 is mounted at an upper end of the elastic member 130, and a sliding ball 140 is mounted at a lower end of the elastic member 130. The upper end of the elastic member 130 closely contacts the upper body 40 and applies elastic force thereto. The lower surface of the upper body 40 that closely contacts the elastic member 130 is flat.

The sliding rod 110 penetrates the penetration hole 150 and is connected to a head 80. Since width of the head 80 is larger than that of the penetration hole 150, the head 80 limits the upward movement of the upper body 40. In addition, a middle portion of the elastic member 130 penetrates the second guiding hole 100 of the worm wheel 30, and the sliding ball 140 is located on a lower surface of the cam hole 120. Since the width of the sliding ball 140 is larger than that of the cam hole 120, the sliding ball 140 slides along the lower surface of the cam hole 120.

Since the second guiding hole 100 is formed obliquely to the radial direction of the worm wheel 30, the elastic member 130 moves along the second guiding hole 100 and a moving direction of the elastic member 130 is the radial direction of the worm wheel 30 when the worm wheel 30 rotates.

For instance, in FIG. 1, when the worm wheel 30 rotates counterclockwise, the slanted second guiding hole 100 pushes the elastic member 130 toward the center of the worm wheel 30 so that the distance between the elastic member 130 and the center of the worm wheel 30 becomes shorter. In contrast, when the worm wheel 30 rotates clockwise, the slanted second guiding hole 100 pushes the elastic member 130 outwards from the center of the worm wheel 30 so that the distance between the elastic member 130 and the center of the worm wheel 30 becomes longer.

Since the lower surface of the cam hole 120 is slanted downwards, the elastic member 130 moves upwardly or downwardly in the radial direction of the worm wheel 30. Furthermore since the lower surface of the cam recess 90 is slanted downwards, the ball hinge 70 moves the upper body 40 upwardly or downwardly in the radial direction of the worm wheel 30. Therefore, the upper body 40 moves upwardly or downwardly by upward or downward movement of the ball hinge 70 and the elastic member 130 and thus engages or releases the clutch.

According to various embodiments of the present invention, the first and second guiding holes 160 and 100 are formed in parallel with each other, and the cam recess 90 and the cam hole 120 are slanted in opposite directions from each other. However, the spirit of the present invention is not limited to this embodiment. That is, the spirit of the present invention includes any structures in which the ball hinge 70 and the elastic member 130 move in radially opposite directions of the worm wheel 30 when the worm wheel 30 rotates.

Figure 4:
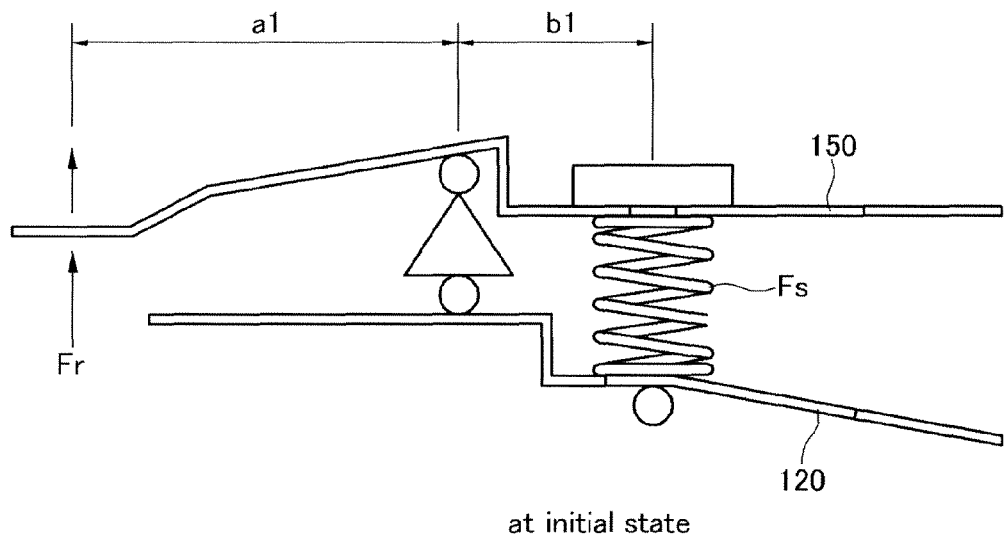
FIGS. 4A and 4B are a schematic diagram for explaining an operation of an exemplary clutch actuator assembly according to the present invention.
Figure 4:
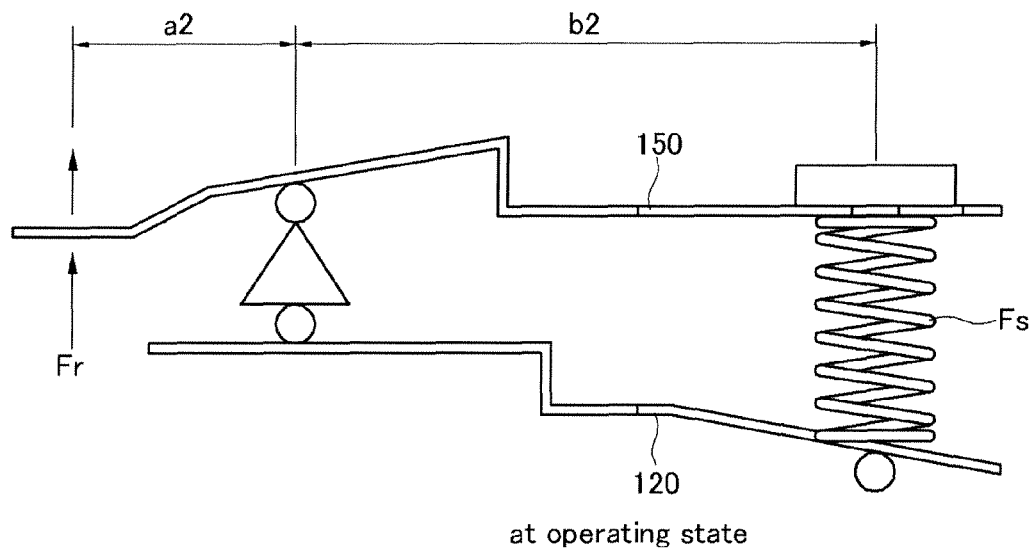

Referring to FIG. 4A and 4B, operation of the clutch actuator assembly according to various embodiments of the present invention will hereinafter be described in detail.

FIG. 4A and 4B are a schematic diagram for explaining an operation of a clutch actuator assembly according to various embodiments of the present invention.

As shown in FIG. 4A, assuming that a distance from the ball hinge 70 to the fork 60 is represented as a1, a distance from the ball hinge 70 to the elastic member 130 is represented as b1, and the elastic force of the elastic member 130 is represented as Fs at an initial state, a force Fr applied to the clutch cover by the fork 60 is represented as Equation 1.

$$Fr = Fs*(b1/a1) \quad \text{Equation 1}$$

In this state, if the motor 10 is operated and the worm wheel 30 is rotated, the ball hinge 70 moves along the first guiding hole 160 and the elastic member 130 moves along the second guiding hole 100. Therefore, the ball hinge 70 moves to the left and the elastic member 130 moves to the right as shown in FIG. 4B.

In addition, since the interior surface of the cam recess 90 guiding the ball hinge 70 is slanted downwardly to the left in the drawing, the ball hinge 70 moves to the left and lifts the upper body 40. Similarly, since the lower surface of the cam hole 90 guiding the elastic member 130 is slanted downwardly to the right in the drawing, the elastic member 130 moves to the right and pulls the upper body 40 down. In this case, the length of the elastic member 130 increases and the elastic force also increases. However, the elastic force is designed to change within a predetermined range (i.e., a range where a change of the elastic force is small).

As shown in FIG. 4B, assuming that a distance from the ball hinge 70 to the fork 60 is represented as a2, a distance from the ball hinge 70 to the elastic member 130 is represented as b2, and the elastic force of the elastic member 130 is represented as Fs at an operating state, a force Fr applied to clutch cover by the fork 60 is represented as Equation 2.

$$Fr = Fs*(b2/a2) \quad \text{Equation 2}$$

Since a2 is smaller than a1 and b2 is larger than b1 when comparing Equation 2 with Equation 1, b2/a2 is larger than b1/a1. Therefore, the force Fr applied to the clutch cover by the fork 60 increases, and accordingly the fork 60 separates the clutch cover from the clutch disk.

In addition, if the motor 10 rotates in an opposite direction, the force Fr applied to the clutch cover by the fork 60 decreases and the fork 60 closely contacts the clutch cover to the clutch disk.

Meanwhile, means for supplying elastic force in a direction opposite to the Fr direction may be mounted at the clutch cover.

As described above, because operation of a clutch is controlled by a motor, a clutch actuator assembly of the present invention can be easily applied to a double clutch transmission or an automated manual transmission.

In addition, because power of a motor is used in order to only move a ball hinge and an elastic member and a clutch is operated by elastic force of the elastic member, a motor with a low capacity can be used for a clutch actuator assembly of the present invention.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A clutch actuator assembly comprising:
    a motor provided with a worm shaft, wherein a screw thread is formed at an exterior circumference of the worm shaft;
    a worm wheel having first and second guiding holes and provided with a worm gear at outer circumference thereof to be engaged to the screw thread of the worm shaft;
    operation units mounted in the first and second guiding holes and moving in a radial direction from or to a rotation center of the worm wheel by operation of the worm wheel;
    an upper body including a penetration hole; and
    a supporter for rotatably supporting the worm wheel, wherein the worm wheel is displaced between the upper body and the supporter;
    wherein the operation units comprises:
        a ball hinge mounted in the first guiding hole and movable along the first guiding hole; and
        an elastic member mounted in the second guiding hole and movable along the second guiding hole.

2. The clutch actuator assembly of claim 1, wherein a fork is formed at the end portion of the upper body.

3. The clutch actuator assembly of claim 1, wherein the ball hinge further comprises an upper ball and a lower ball, the upper ball slidably disposed between the upper body and the worm wheel and having a diameter larger than a width of the first guiding hole, and the lower ball slidably disposed between the worm wheel and the supporter and having a diameter larger than a width of the first guiding hole.

4. The clutch actuator assembly of claim 1, wherein a cam recess is formed at the upper body and moves pivotally the upper body upwardly or downwardly when the ball hinge moves in the radial direction in the cam recess in a contact with the cam recess.

5. The clutch actuator assembly of claim 4, wherein an interior surface of the cam recess is inclined with respect to a plane normal to the rotation center of the worm wheel, and an upper surface of the supporter confronting the cam recess is flat.

6. The clutch actuator assembly of claim 4, wherein longitudinal axes of the penetration hole and the cam recess are in parallel each other.

7. The clutch actuator assembly of claim 1, wherein a cam hole is formed at a lower surface of the supporter and configured to move pivotally the upper body upwardly or downwardly when the elastic member moves along the radial direction of the worm wheel in the cam hole.

8. The clutch actuator assembly of claim 7, wherein the lower surface of the cam hole is inclined with respect to a plane normal to the rotation center of the worm wheel, and a lower surface of the upper body confronting the cam hole is flat.

9. The clutch actuator assembly of claim 7, wherein longitudinal axis of the cam hole is in parallel to longitudinal axis of the penetration hole.

10. The clutch actuator assembly of claim 7, wherein the elastic member is mounted at a lower end of a sliding rod, an upper end of the sliding rod penetrates the upper body through the penetration hole and is connected to a head for limiting the upward movement of the upper body, wherein the head is larger than width of the penetration hole.

11. The clutch actuator assembly of claim 10, wherein diameter of the elastic member is larger than width of the penetration hole.

12. The clutch actuator assembly of claim 10, wherein a sliding ball sliding on the lower surface of the supporter is mounted at a lower end of the elastic member.

13. The clutch actuator assembly of claim 1, wherein the first and second guiding holes are formed obliquely to the radial direction of the worm wheel and are formed in parallel with each other.

14. The clutch actuator assembly of claim 13, wherein the first and second guiding holes are spaced from the rotation center of the worm wheel with the same distance.

* * * * *

UNITED STATES PATENT AND TRADEMARK OFFICE
CERTIFICATE OF CORRECTION

PATENT NO. : 8,104,596 B2
APPLICATION NO. : 12/274148
DATED : January 31, 2012
INVENTOR(S) : Il Soo Kim et al.

It is certified that error appears in the above-identified patent and that said Letters Patent is hereby corrected as shown below:

Title Page, Item (75):

Change fourth inventor "Han Ho Kwang" to --Han Ho Hwang--.

Change fifth inventor "Woo Jim Cha" to --Woo Jin Cha--.

Signed and Sealed this
Seventeenth Day of April, 2012

David J. Kappos
*Director of the United States Patent and Trademark Office*